US008634362B2

(12) United States Patent
Montojo et al.

(10) Patent No.: US 8,634,362 B2
(45) Date of Patent: Jan. 21, 2014

(54) REFERENCE SIGNALS FOR MULTI-USER MIMO COMMUNICATION

(75) Inventors: Juan Montojo, San Diego, CA (US); Tao Luo, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 277 days.

(21) Appl. No.: 12/890,275

(22) Filed: Sep. 24, 2010

(65) Prior Publication Data
US 2011/0235597 A1    Sep. 29, 2011

Related U.S. Application Data

(60) Provisional application No. 61/247,839, filed on Oct. 1, 2009.

(51) Int. Cl.
*H04W 4/00* (2009.01)

(52) U.S. Cl.
USPC .......................................................... 370/329

(58) Field of Classification Search
None
See application file for complete search history.

(56) References Cited

U.S. PATENT DOCUMENTS

| 2009/0132675 A1* | 5/2009 | Horn et al. ................... 709/207 |
| 2009/0238064 A1* | 9/2009 | Lee et al. ..................... 370/208 |
| 2009/0238366 A1* | 9/2009 | Park et al. .................... 380/270 |

FOREIGN PATENT DOCUMENTS

WO    2010077690    7/2010

OTHER PUBLICATIONS

"3rd Generation Partnership Project; Technical Specification Group Radio Access Network; Evolved Universal Terrestrial Radio Access (E-UTRA); Physical Channels and Modulation" (Release 8), 3GPP TS 36.211 V8.9.0, Dec. 2009.
3rd Generation Partnership Project; Technical Specification Group Radio Access Network; Evolved Universal Terrestrial Radio Access (E-UTRA); Physical Channels and Modulation (Release 8) 3GPP Standard; 3GPP TS 36.211, SRD Generation Partnership Project (3GPP), Mobile Competence Centre ; 650, Route Des Lucioles ; F06921 Sophia-Antipolis Cedex ; France, No. V8.6.0, Mar. 1, 2009, pp. 1-83, XP050377538.
Huawei: "Interference analysis on SRS for CoMP", 3GPP Draft; R1-093039, 3RD Generation Partnership Project (3GPP), Mobile Competence Centre ; 650, Route Des Lucioles ; F-06921 Sophia-Antipolis Cedex ; France, no. Shenzhen, China; 20090818, Aug. 18, 2009, XP050351432, [retrieved on Aug. 18, 2009] paragraphs [0001]-[0003], [0005].
International Search Report and Written Opinion—PCT/US2010/050916, International Search Authority—European Patent Office—Dec. 15, 2010.

(Continued)

*Primary Examiner* — Yong Zhou
(74) *Attorney, Agent, or Firm* — Liem T. Do

(57) ABSTRACT

Methods and apparatuses are provided that facilitate generating sequences for transmitting reference signals (RS) based at least in part on a cell identifier or other parameters common for a plurality of cells. Where the plurality of cells provide similar joint uplink resources to a device in multi-user multiple-input multiple-output (MIMO), the device can transmit a signal to the plurality of cells over the joint uplink resources. For RSs transmitted according to a sequence generated based on a cell specific identifier or other parameters, the device can utilize a cell identifier, or other parameters, common to the plurality of cells such that the plurality of cells can all decode the RSs. In this regard as well, the plurality of cells can each receive or generate the common cell identifier or other parameters to properly decode the RSs.

56 Claims, 10 Drawing Sheets

(56) References Cited

OTHER PUBLICATIONS

Nokia Siemens Networks et al: "Uplink DM RS performance evaluation from CoMP viewpoint", 3GPP Draft; R1-093307, 3RD Generation Partnership Project (3GPP), Mobile Competence Centre ; 650, Route Des Lucioles ; F-06921 Sophia Antipolis Cedex ; France, no. Shenzhen, China; 20090818, Aug. 18, 2009, XP050351631, [retrieved on Aug. 18, 2009] the whole document.
Taiwan Search Report—TW099133577—TIPO—Feb. 8, 2013.

3rd Generation Partnership Project; Technical Specification Group Radio Access Network; Evolved Universal Terrestrial Radio Access (E-UTRA); Physical Channels and Modulation 3GPP TS 36.211 V8.6.0 (Mar. 2009).
Panasonic: "Comparison of Orthogonal/Non-orthogonal CoMP transmission for PUCCH", 3GPP Draft; R1-093460, 3rd Generation Partnership Project (3GPP), Mobile Competence Centre; 650, Route des Lucioles; F-06921 Sophia-Antipolis Cedex; France, No. Shenzhen, China; Aug. 18, 2009, XP050351730, [retrieved on Aug. 18, 2009].

* cited by examiner

REFERENCE SIGNALS FOR MULTI-USER MIMO COMMUNICATION

CLAIM OF PRIORITY UNDER 35 U.S.C. §119

The present application for patent claims priority to Provisional Application No. 61/247,839 entitled "REFERENCE SIGNALS FOR MULTI-USER MIMO COMMUNICATION," filed Oct. 1, 2009, and assigned to the assignee hereof and hereby expressly incorporated by reference herein.

BACKGROUND

1. Field

The following description relates generally to wireless communications, and more particularly to generating and transmitting reference signals.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, etc.). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

Moreover, for example, devices can transmit demodulation reference signals (DM-RS) to the base stations to assist in demodulating communications from the devices. In some wireless communication systems, such as LTE release 8, orthogonality (or at least pseudo-orthogonality) of DM-RSs related to disparate devices can be implemented by transmitting the DM-RSs according to different shifts of a sequence of resource elements. The shift can be defined at least in part according to an identifier specific to a cell of the base station with which the device communicates. Moreover, the sequence can also be initialized according to the identifier of the cell. Furthermore, in an example, a wireless communication system can support uplink multi-user MIMO where multiple cells (and/or base stations) can schedule joint uplink resources to the device. Thus, the device can simultaneously communicate with the base stations over the jointly scheduled uplink resources (e.g., to increase uplink bandwidth in the wireless communication system).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more embodiments and corresponding disclosure thereof, various aspects are described in connection with facilitating utilizing a same sequence for transmitting reference signals to multiple base stations in multi-user multiple-input multiple-output (MIMO) mode. In an example, a common cell identifier can be utilized to initialize the sequence, determine a shift of the sequence, and/or the like, effectively removing cell dependency from the sequence. Thus, a device can transmit reference signals using substantially the same sequence to one or more base stations over jointly scheduled uplink resources, and the base stations can properly decode and/or process the reference signals though the signals may not be encoded with a cell identifier specific to the base station.

According to an example, a method for reference signal transmission in wireless communications is provided that includes acquiring a cell identifier common for a plurality of cells and generating a pseudo-random sequence (PRS) based at least in part on the cell identifier. The method further includes transmitting one or more reference signals to the plurality of cells based at least in part on the PRS.

In another aspect, a wireless communications apparatus for transmitting reference signals is provided that includes at least one processor configured to determine a cell identifier common for a plurality of cells and generate a PRS based at least in part on the cell identifier. The at least one processor is further configured to transmit one or more reference signals to the plurality of cells over similar resource assignments based at least in part on the PRS. In addition, the wireless communications apparatus includes a memory coupled to the at least one processor.

In yet another aspect, an apparatus for transmitting reference signals in wireless communications is provided that includes means for acquiring a cell identifier common for a plurality of cells and means for generating a PRS based at least in part on the cell identifier. The apparatus further includes means for transmitting one or more reference signals to the plurality of cells based at least in part on the PRS.

Still, in another aspect, a computer-program product is provided for transmitting reference signals in wireless communications that includes a computer-readable medium having code for causing at least one computer to determine a cell identifier common for a plurality of cells and code for causing the at least one computer to generate a PRS based at least in part on the cell identifier. The computer-readable medium further includes code for causing the at least one computer to transmit one or more reference signals to the plurality of cells over similar resource assignments based at least in part on the PRS.

Moreover, in an aspect, an apparatus for transmitting reference signals in wireless communications is provided that includes a cell information determining component that acquires a cell identifier common for a plurality of cells and a PRS initializing component that generates a PRS based at least in part on the cell identifier. The apparatus further includes a reference signal RS transmitting component that transmits one or more reference signals to the plurality of cells based at least in part on the PRS.

Further, in another aspect, a method for wireless communications is provided that includes receiving one or more reference signals based at least in part on a pseudo-random sequence (PRS) and decoding the one or more reference signals. The PRS is generated based at least in part on a cell identifier common for a plurality of cells.

Additionally, in an aspect, an apparatus for wireless communications is provided that includes a receiver for receiving one or more reference signals based at least in part on a pseudo-random sequence (PRS) and a decoder for decoding the one or more reference signals. The PRS is generated based at least in part on a cell identifier common for a plurality of cells.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
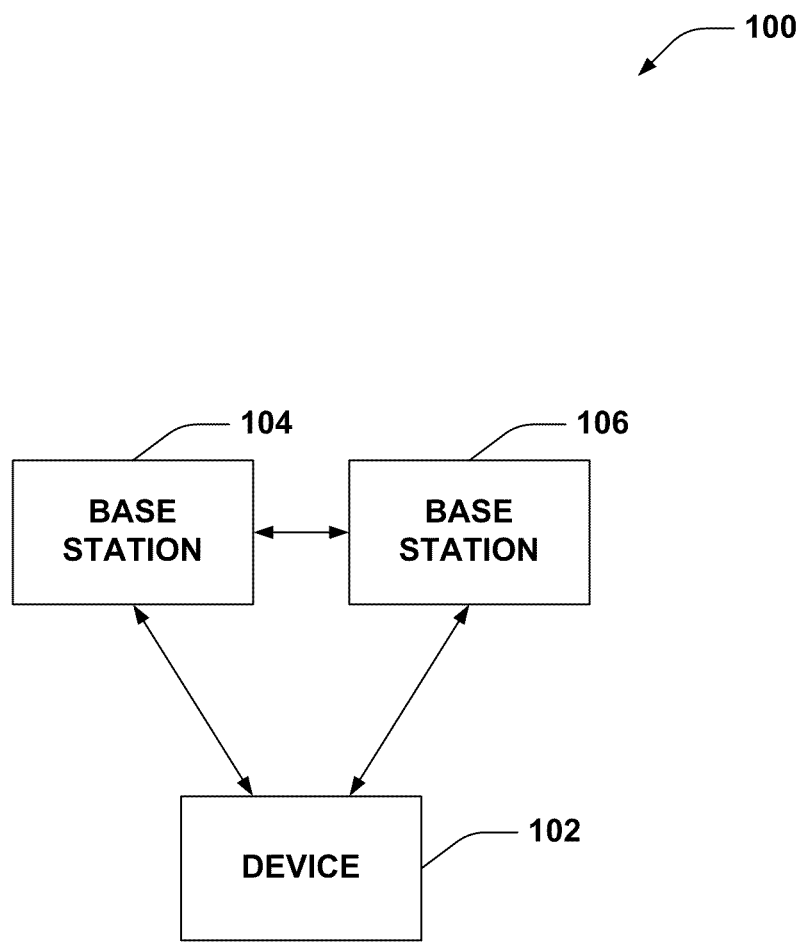
FIG. 1 illustrates an example system for allowing uplink multi-user multiple-input multiple-output (MIMO) communications.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As described further herein, cell dependency can be removed from reference signal (RS) transmission while maintaining orthogonality thereof in multi-user multiple-input multiple-output (MIMO) systems. For example, in multi-user MIMO systems, a device can transmit a single communication to multiple cells over similar uplink resources. For some RSs (e.g., demodulation RSs (DM-RS)), devices can initialize a sequence for transmitting the RSs, define a shift for the sequence, etc., such that substantially all of the multiple cells can decode the RSs. In this regard, the device can utilize a cell identifier common to the multiple cells (or other parameters common to the multiple cells) in initializing the RS sequence, shifting the RS sequence, etc. to remove cell specificity. In one example, the cell identifier can be that of a serving cell (e.g., where the wireless communication system allows for one serving cell), which can be provided to the other cells for decoding the RSs. In another example, a virtual cell identifier can be generated and utilized by the multiple cells and the device to process the RSs. Similarly, where other parameters are used, the other parameters can relate to the serving cell and/or can be coordinated among the cells for consistent RS processing.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, illustrated is a wireless communication system 100 for communicating in a wireless network using multi-user MIMO. System 100 includes a device 102 that can communicate with base stations 104 and 106 to receive access to a wireless network (not shown). For example, device 102 can be a UE, modem (or other tethered device), a portion thereof, or substantially any device that can receive access to a wireless network, such as a relay node, a mobile or other base station, and/or the like. Base stations 104 and 106 can each be a macrocell, femtocell, picocell, or similar base station, relay node, mobile base station, UE (e.g., communicating in peer-to-peer or ad-hoc mode with device 102), a portion thereof, and/or substantially any device that provides one or more disparate devices with access to a wireless network. In this regard, for example, device 102 can communicate with base stations 104 and/or 106 over an uplink and/or receive communications therefrom over a downlink.

In multi-user MIMO, as described, device 102 can communicate with base stations 104 and 106 simultaneously over substantially similar uplink resources granted to the device 102 by base stations 104 and 106. In addition, device 102 can transmit RSs to base stations 104 and 106, such as DM-RS, sounding RS (SRS), and/or the like, over the uplink resources. Device 102 can generate some RSs, such as DM-RS, based at least in part on a cell identifier to substantially orthogonalize the RS with respect to other devices transmitting similar signals over shared resources to base stations 104 and/or 106. In this regard, device 102 can utilize a cell identifier common to base station 104 and base station 106 (and/or other base stations to which device 102 is communicating in multiuse MIMO), or other parameters common to the base stations, to generate the RSs.

In one example, device 102 can utilize a cell identifier of the serving cell (e.g., where the wireless communication system specifies using a serving cell), a virtual cell identifier related to base station 104 and/or 106 (e.g., a cell identifier generated by a network, base station 104 or 106, a concatenation or other combination of cell identifiers related to base stations 104 and/or 106, a cluster identifier where the cells are in a similar cluster, etc.), and/or the like. In one example, device 102 can receive the common cell identifier from base station 104 and/or 106. In another example, device 102 can generate the common cell identifier and provide the common cell identifier to the base stations 104 and 106, such that base station 104 and 106 can decode the RSs from device 102 according to the common cell identifier. Generating the RSs can include generating a pseudo-random sequence (PRS) for transmitting the RSs, which can include determining group hopping and/or sequence shifting for a base sequence based on the PRS, defining a further cyclic shift for the PRS, and/or the like, as described further herein.

Thus, in another example, base stations 104 and 106 can communicate over a backhaul link and/or through one or more devices, such as device 102. In one example, base station 104 can generate or otherwise specify a cell identifier to be used for generating RSs related to device 102 (e.g., whether a cell identifier of base station 104, an identifier generated by base station 104, and/or the like) and can notify base station 106 of the cell identifier. In another example, base stations 104 and 106 can each generate the cell identifier according to similar instructions based at least in part on specific identifiers for cells within which device 102 is communicating (e.g., according to hardcoding, configuration, specification, etc.). Thus, for example, base station 104 can provide its cell identifier to base station 106, and vice versa, and the base stations 104 and 106 can generate a cell identifier for decoding RSs based at least in part on a combination with the received cell identifier of the other base station (e.g., a concatenation and/or the like). In yet another example, base stations 104 and 106 can receive the cell identifier from one or more upstream network components (not shown).

Figure 2:
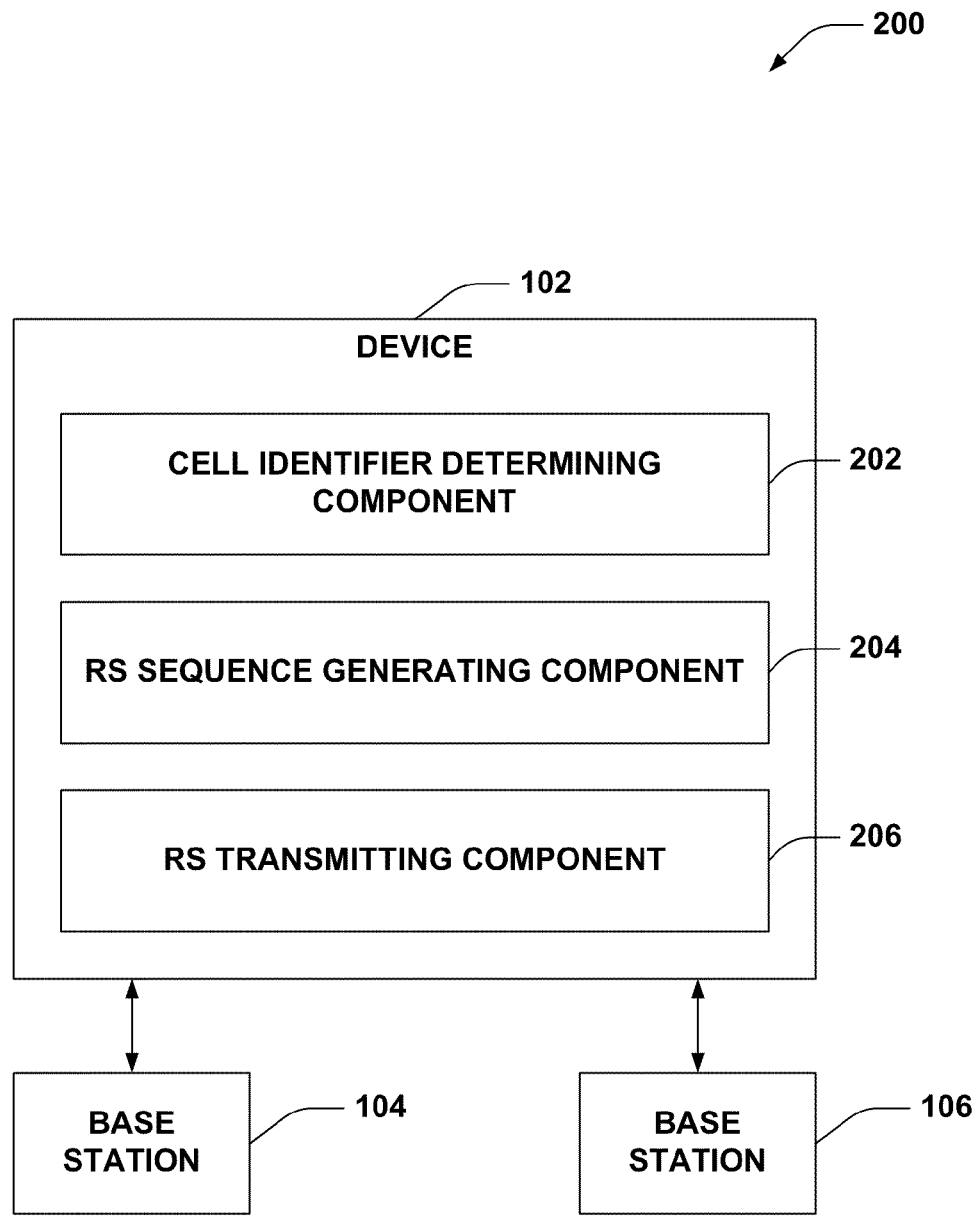
FIG. 2 illustrates an example system for generating sequences for transmitting reference signals (RS) based at least in part on a common cell identifier.

Turning to FIG. 2, illustrated is an example wireless communications system 200 that facilitates communicating an RS to multiple cells according to a cell identifier common to the multiple cells. System 200 includes a device 102, which as described can communicate with a plurality of base stations, such as base stations 104 and 106, in a multi-user MIMO mode. Device 102 can include a cell identifier determining component 202 that obtains a cell identifier common to a plurality of cells in a wireless network, and an RS sequence generating component 204 that can initialize a PRS for transmitting RSs to one or more base stations based at least in part on the cell identifier to maintain orthogonality thereof. Device 102 also includes a RS transmitting component 206 that transmits one or more RSs over uplink multi-user MIMO resources to a plurality of base stations according to the PRS.

According to an example, device 102 can receive multi-user MIMO resources from base stations 104 and 106, as described, for communicating therewith. The resources can be substantially similar in frequency location and period of time, and can include one or more resource elements in one or more resource blocks. In addition, the resources can be shared among multiple devices communicating within one or more cells provided by base station 104 and/or 106 (e.g., in a physical uplink shared channel (PUSCH) or similar channel). It is to be appreciated that device 102 may not be informed regarding multi-user MIMO communications, rather the resource grants from multiple base stations 104 and 106 can be transparent (e.g., and/or can be received as a single resource grant). In another example, however, base station 104 and/or 106 can signal an indication of multi-user MIMO mode, and/or base stations involved in the multi-user MIMO mode, to device 102 via signaling (e.g., higher layer or layer 2 signaling, and/or the like).

Moreover, for example, the resource elements can each be portions of one or more symbols (e.g., frequency subcarriers) in the one or more resource blocks, and the one or more symbols can relate to orthogonal frequency division multiplexing (OFDM) symbols, single-carrier frequency division multiple access (SC-FDMA) symbols, and/or the like. In addition, for example, a number of symbols can form a slot and/or a subframe (in one example, a slot can be made up of multiple subframes), and one or more subframes can relate to a radio frame. Device 102 can transmit RSs to base stations 104 and 106, as described, over a set of resource elements according to a PRS defined based at least in part on a cell identifier, to orthogonalize the RSs. In this regard, as described, a cell identifier common to cells served by base stations 104 and 106, within which device 102 communicates, can be utilized for defining PRSs for some RSs, such as DM-RSs.

In an example, cell identifier determining component 202 can obtain a cell identifier common to cells of base station 104 and 106, within which device 102 communicates, for generating RS sequences. For example, cell identifier determining component 202 can receive the cell identifier from base station 104 and/or 106, generate the cell identifier based at least in part on identifiers specific to the related cells (e.g., as a concatenation or other combination of the specific identifiers, a cluster identifier where the cells are in a similar cluster, etc.), and/or the like, such that base stations 104 and 106 and device 102 can all utilize the same cell identifier for processing RSs from device 102. As described, in an example, device 102 may not be aware of the multi-user MIMO communication, and base station 104 or 106 can provide the cell identifier common to base stations 104 and 106, or other parameters, to device 102 along with the resource grant. In either example, whether the cell identifier is generated by device 102 or received exclusively or transparently, RS sequence generating component 204 can define a PRS for transmitting DM-RSs according to the cell identifier common to base stations 104 and 106.

As described, for example, RS sequence generating component 204 can generate the PRS at least in part by initializing the PRS based at least in part on the cell identifier common to base stations 104 and 106. In another example, RS sequence generating component 204 can select a PRS based at least in part on determining group or sequence hopping based at least in part on the cell identifier. Moreover, in an example, RS sequence generating component 204 can cyclically shift the PRS (e.g., according to a disparate PRS over a period of time) for transmitting RSs to provide further orthogonality. In any case, RS transmitting component 206 can transmit one or more RSs to base stations 104 and 106 based at least in part on the PRS. Though shown with respect to two base stations 104 and 106, it is to be appreciated that aspects described herein can be implemented for substantially any number of base stations that provide similar uplink resources to device 102.

Figure 3:
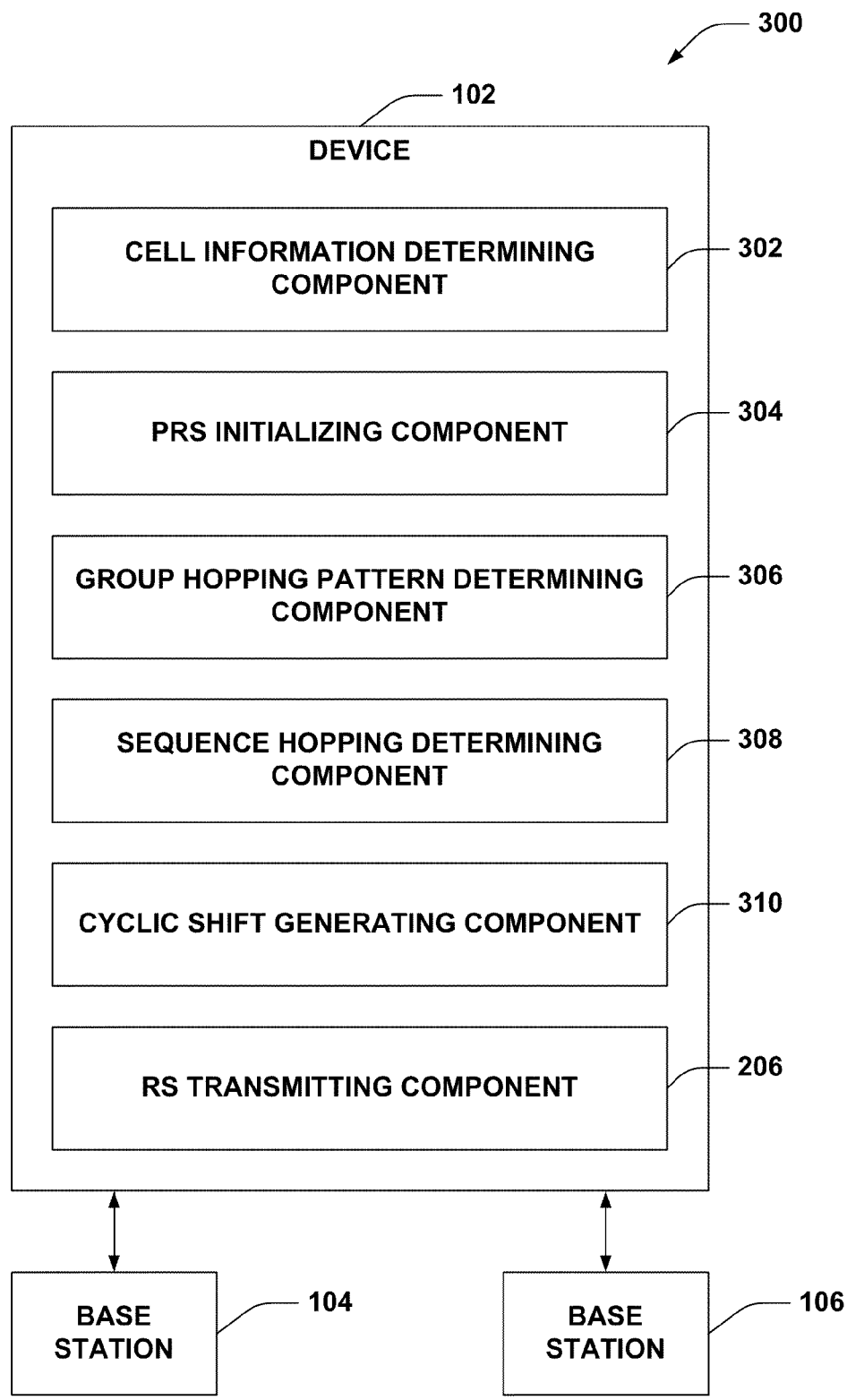
FIG. 3 illustrates an example system that facilitates generating pseudo-random sequences (PRS) based on a cell identifier common to a plurality of cells.

Referring to FIG. 3, illustrated is an example wireless communications system 300 that generates RSs for communicating to multiple cells according to a cell identifier common to the multiple cells. System 300 includes a device 102, which as described can communicate with a plurality of base stations, such as base stations 104 and 106, in a multi-user MIMO mode. Device 102 can include a cell information determining component 302 that obtains a cell identifier and/or other parameters common to a plurality of cells in a wireless network, and a PRS initializing component 304 that creates a PRS for transmitting RSs in a wireless network based at least in part on the cell information. Device 102 also includes a group hopping pattern determining component 306 that obtains a group hopping pattern for an RS based at least in part on the cell information, and a sequence hopping determining component 308 that obtains a sequence hopping within a group for the RS based at least in part on the cell information. Moreover, device 102 comprises a cyclic shift generating component 310 that optionally defines a cyclic shift for the PRS according to a cell identifier common to one or more base stations, and a RS transmitting component 206 that transmits one or more RSs over uplink multi-user MIMO resources to a plurality of base stations according to the PRS.

According to an example, as described, cell information determining component 302 can obtain a cell identifier common to cells of base stations 104 and 106 within which device 102 communicates, as described. PRS initializing component 304 can create a PRS for simultaneously transmitting an RS to base stations 104 and 106 based at least in part on the cell identifier. In one example, group hopping pattern determining component 306 can obtain a group hopping pattern for the PRS, and/or sequence hopping determining component 308 can obtain a sequence within the group for determining the PRS, based at least in part on the cell identifier and/or one or more disparate parameters common to base stations 104 and 106. In this example, PRS initializing component 304 can create the PRS based at least in part on the group hopping pattern and/or the sequence within the group. In any case, RS transmitting component 206 can transmit an RS according to the PRS, as described. In addition, in an example, cyclic shift generating component 310 can optionally apply a cyclic shift to the PRS (e.g., according to a disparate PRS) for a given period of time to provide further orthogonality, where the cyclic shift can be initialized with a disparate PRS over the given period of time.

In one example, PRS initializing component 304 can select the PRS from a plurality of PRSs specified in a hardcoding, configuration, specification, and/or the like, based at least in part on a desired length of the PRS. In this example, cell information determining component 302 can obtain a parameter common to cells of base stations 104 and 106, within which device 102 communicates, indicating whether group hopping is enabled (e.g., the parameter can be received from one or more of the base stations 104 and/or 106, generated based at least in part on parameters received from the base stations 104 and 106, and/or the like, as described with respect to other parameters). In this example, group hopping pattern determining component 306 can determine a group hopping pattern $f_{gh}(n_s)$ for a given slot, $n_s$, of the PRS, which can be utilized by PRS initializing component 304 to select the PRS, based at least in part on the following:

$$f_{gh}(n_s) = \begin{cases} 0 & \text{if group hopping is disabled} \\ \left(\sum_{i=0}^{7} c(8n_s + i) \cdot 2^i\right) \bmod 30 & \text{if group hopping is enabled} \end{cases}$$

where c(i) is a pseudo-random sequence defined by the following $$c(n)=(x_1(n+N_c)+x_2(n+N_c))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2$$

where $N_c$=1600. Moreover, in this regard, c(i) can be a length-31 Gold sequence. Where group hopping is enabled, group hopping pattern determining component 306 can initialize c(i) with $$c_{init} = \left\lfloor \frac{N_{ID}^{cell}}{30} \right\rfloor$$

at the beginning of each radio frame, where $N_{ID}^{cell}$ is the cell identifier common to base station 104 and 106 obtained by cell information determining component 302, as described. Group hopping pattern determining component 306 can additionally determine a sequence shift pattern related to the group hopping pattern, which can also be utilized by the PRS initializing component 304 to select the PRS. In this example, group hopping pattern determining component 306 determines a sequence shift pattern, $f_{ss}^{PUSCH}$, for the PUSCH utilized by device 102, for a given slot of the PRS according to a formula similar to the following:

$$f_{ss}^{PUSCH}=(f_{ss}^{PUCCH}+\Delta_{ss})\bmod 30$$

where $f_{ss}^{PUCCH}=N_{ID}^{cell}\bmod 30$, and $\Delta_{ss}\in\{0, 1, \ldots, 29\}$. It is to be appreciated that $\Delta_{ss}$ can be common for base stations 104 and 106, and can be further obtained by cell information determining component 302 (e.g., from one or more of the base stations 104 or 106, generated based at least in part on parameters from base stations 104 and 106, and/or the like). In one example, group hopping pattern determining component 306 can add this value to the group hopping pattern, $f_{gh}(n_s)$, to generate a sequence group number, u, from which PRS initializing component 304 can determine the PRS.

Moreover, in an example, cell information determining component 302 can obtain a parameter common to cells of base stations 104 and 106, within which device 102 communicates, indicating whether sequence hopping is enabled (e.g., the parameter can be received from one or more of the base stations 104 and/or 106, generated based at least in part on parameters received from the base stations 104 and 106, and/or the like, as described with respect to other parameters). If so, sequence hopping determining component 308 can obtain a sequence number, v, within a group related to the PRS, and PRS initializing component 304 can select the PRS according to the sequence group number, u, and the sequence number, v, within the sequence group for slot, $n_s$. It is to be appreciated that sequence hopping determining component 308 can obtain the sequence number, v, where the desired length of the PRS is at least 6 symbols (e.g., otherwise v=0). In this case, sequence hopping determining component 308 can compute v according to a formula similar to the following:

$$v = \begin{cases} c(n_s) & \text{if group hopping is disabled and sequence hopping is enabled} \\ 0 & \text{otherwise} \end{cases}$$

Where sequence hopping is enabled, sequence hopping determining component 308 can initialize c(i) with $$c_{init} = \left\lfloor \frac{N_{ID}^{cell}}{30} \right\rfloor \cdot 2^5 + f_{ss}^{PUSCH}$$

at the beginning of each radio frame, where $N_{ID}^{cell}$ is the cell identifier common to base station 104 and 106 obtained by cell information determining component 302, and $f_{ss}^{PUSCH}$ is the sequence shift pattern, as described above. Moreover, as described, PRS initializing component 304 can select a PRS from a plurality of PRSs known by device 102 (e.g., based on hardcoding, configuration, specification, and/or the like) according to u and v, and RS transmitting component 206 can transmit an RS simultaneously to base stations 104 and 106 over similar resources according to the PRS.

Furthermore, in an example, slot indices for radio frames of base station 104 and 106 can be aligned, but can differ (e.g., an initial slot index of a radio frame at base station 104 can begin with 0, while an initial slot index at base station 106 begins at 1). In this example, cell information determining component 302 can similarly obtain a slot index alignment, which can include set of slot indices and/or an initial slot index common for base stations 104 and 106 (e.g., by receiving a slot index from a serving cell, determining a slot index based at least in part on slot indices received from base stations 104 and 106, and or the like). Thus, PRS initializing component 304 can utilize the received slot index alignment in generating and/or initializing the PRS, as described above and further herein.

In a more specific example, for DM-RS, sequence hopping and group hopping can be enabled, as described above, and PRSs can be accordingly initialized by PRS initializing component 304. Moreover, cyclic shift generating component 310 can apply a cyclic shift to the PRS to provide further orthogonality. Thus, for example, PRS initializing component 304 can select the PRS, as described above, and cyclic shift generating component 310 can define the cyclic shift of the PRS similarly as in LTE using a cell identifier. In this example, however, the cell identifier can be common to base stations 104 and 106, as described above. Thus, for example, cyclic shift generating component 310 can define the cyclic shift of the base sequence according to a formula similar to the following:

$$n_{cs}=(n_{DMRS}^{(1)}+n_{DMRS}^{(2)}+n_{PRS}(n_s))\bmod 12$$

where $n_{DMRS}^{(1)}$ is cell-specific and semi-static (e.g., and can also be received by cell information determining component 302, in one example), $n_{DMRS}^{(2)}$ is an identifier specific to device 102 and can be dynamically indicated in physical downlink control channel (PDCCH) downlink control information (DCI) format 0 in LTE by base station 104 and/or 106, and $n_{PRS}(n_s)$ is a PRS. In this example, $n_{PRS}(n_s)$ can be created by PRS initializing component 304 based at least in part on the cell identifier obtained by cell information determining component 302, and/or selected, as described above. For example, PRS initializing component 304 can define the PRS, $n_{PRS}(n_s)$, according to a formula similar to the following:

$$n_{PRS}(n_s) = \sum_{i=0}^{7} c(8N_{symb}^{UL} \cdot n_s + i) \cdot 2^i$$

where $n_s$ (=0, 1, ..., 19) relates to a slot index, c(i) is another PRS, and $N_{symb}^{UL}$ is a number of possible uplink symbols that can be utilized to transmit the RS. Moreover, PRS initializing component 304, in this example, can initialize the PRS according to a formula similar to the following:

$$c_{init} = \left\lfloor \frac{N_{ID}^{cell}}{30} \right\rfloor \cdot 2^5 + f_{ss}^{PUSCH}$$

where $N_{ID}^{cell}$ is the cell identifier common to base station 104 and 106, and $f_{ss}^{PUSCH}$ is a sequence shift pattern, as described. It is to be appreciated that where multiple codewords are introduced in the multi-user MIMO configuration, PRS initializing component 304 can generate $c_{init}$ based at least in part on adding $q*2^{10}$ to the above formula, where q is the codeword index (e.g., 0 or 1 for two codewords). It is to be appreciated that the above formulas are intended to illustrate one possible aspect of the functionality described herein, and substantially limitless alternatives are possible where sequence generation can depend on a cell identifier or other parameters indicated as common to multiple cells within which device 102 communicates.

Figure 4:
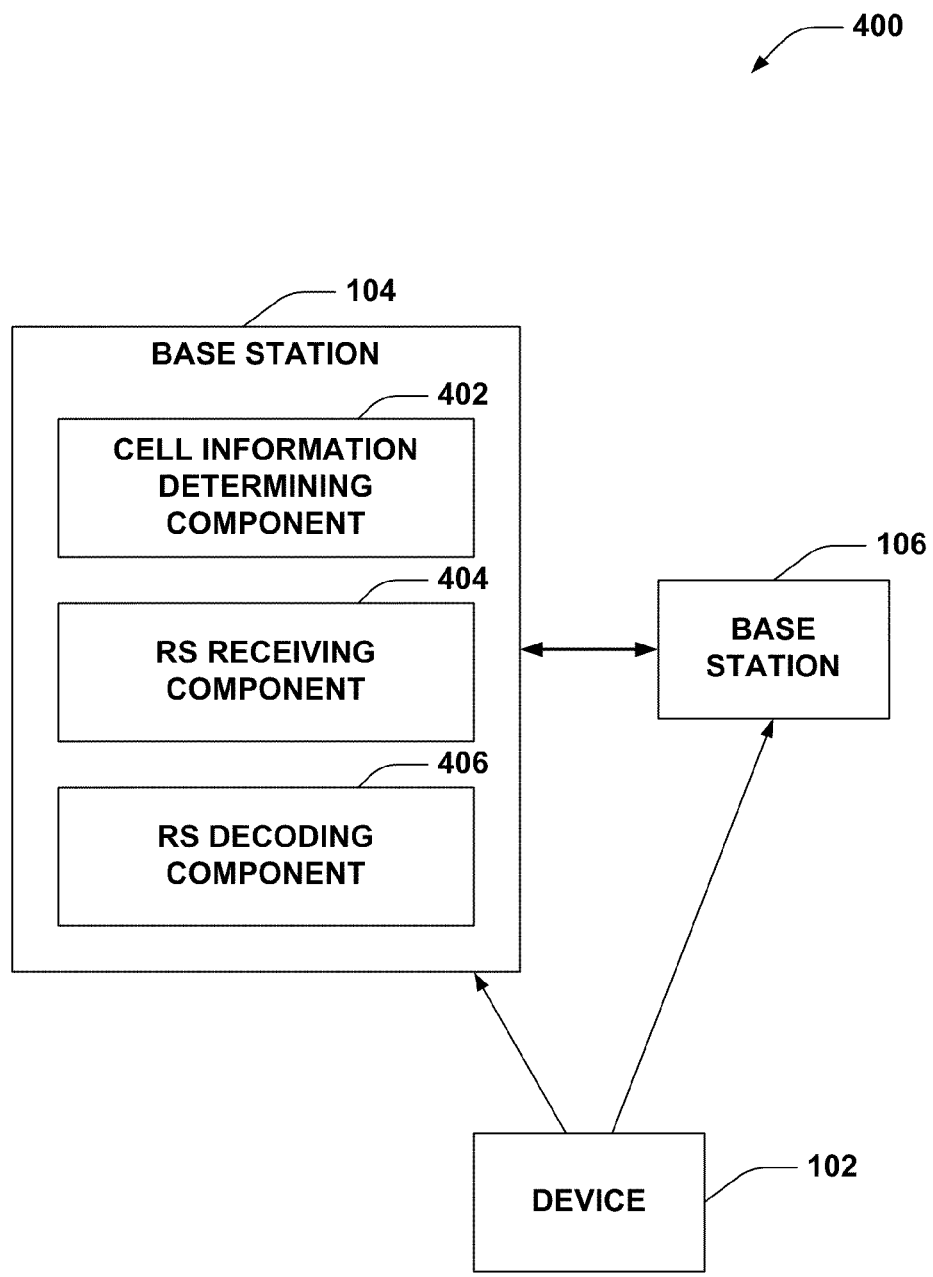
FIG. 4 illustrates an example system for determining a cell identifier or other parameters common with one or more base stations or related cells.

Turning now to FIG. 4, an example wireless communications system 400 that communicates cell information common among one or more cells for the purpose of decoding RSs is illustrated. System 400 includes a device 102, which as described can communicate with a plurality of base stations, such as base stations 104 and 106, in a multi-user MIMO mode. Base stations 104 and 106 can communicate over a backhaul link at least to coordinate cell information common to cells provided by base stations 104 and 106 for the purpose of decoding reference signals from device 102, as described. Base station 104 comprises a cell information determining component 402 that can obtain cell information common for base station 104 and another base station, which a device can utilize in generating PRSs for transmitting RSs. Base station 104 also comprises an RS receiving component 404 that obtains an RS from the device, and an RS decoding component 406 that decodes the RS.

According to an example, cell information determining component 402 can obtain a cell identifier or other parameters common to base station 104 and base station 106 (and/or other base stations communicating with device 102 in multi-user MIMO) for decoding reference signals from device 102. In one example, the other parameters can relate to $\Delta_{ss}$, an initial slot index, etc., as described, or substantially any cell dependent value utilized in generating RSs at a device. Moreover, in an example, cell information determining component 402 can obtain the cell identifier or other parameters from base station 106, device 102, or a disparate network component. In another example, cell information determining component 402 can generate the cell identifier or other parameters based at least in part on the cell identifier or parameters local to base station 104. In this example, cell information determining component 402 can provide the cell identifier or other parameters to base station 106 for utilizing in decoding RSs from device 102.

In yet another example, cell information determining component 402 can generate the cell identifier or other parameters further based at least in part on a cell identifier or other parameters of base station 106. Thus, in one example, cell information determining component 402 can generate a cell identifier common to base stations 104 and 106 by concatenating the cell identifiers related to cells of base stations 104 and 106 within which device 102 communicates, by utilizing a cluster identifier where the cells are in a similar cluster, and/or the like. Moreover, in one example, cell information determining component 402 can provide the cell identifier or other parameters common to cells of base stations 104 and 106, within which device 102 communicates, to device 102.

In any case, RS receiving component 404 can obtain an RS from device 102 transmitted according to a PRS generated based at least in part on the cell identifier or other parameters, as described, and RS decoding component 406 can decode the RS based at least in part on the cell identifier or other parameters. In another example, device 102 can similarly generate the cell identifier or other parameters as cell information determining component 402, as described, and thus cell information determining component 402 need not transmit such information to device 102. Moreover, for example, base station 106 can also generate the cell identifier or other parameters. In any case, device 102 can use a cell identifier or other parameters common to base stations 104 and 106 to generate reference signals, and base stations 104 and 106 can decode the reference signals using the same cell identifier or other parameters. Furthermore, in an example, cell information determining component 402 can obtain at least an initial slot index (or a set of indices) common for base stations 104 and 106 (e.g., by determining or receiving the slot index or indices, as described) for one or more radio frames for receiving RSs. RS receiving component 404 can align slot indices of base station 104 with those received to properly receive and process RSs from device 102, for example.

Figure 5:
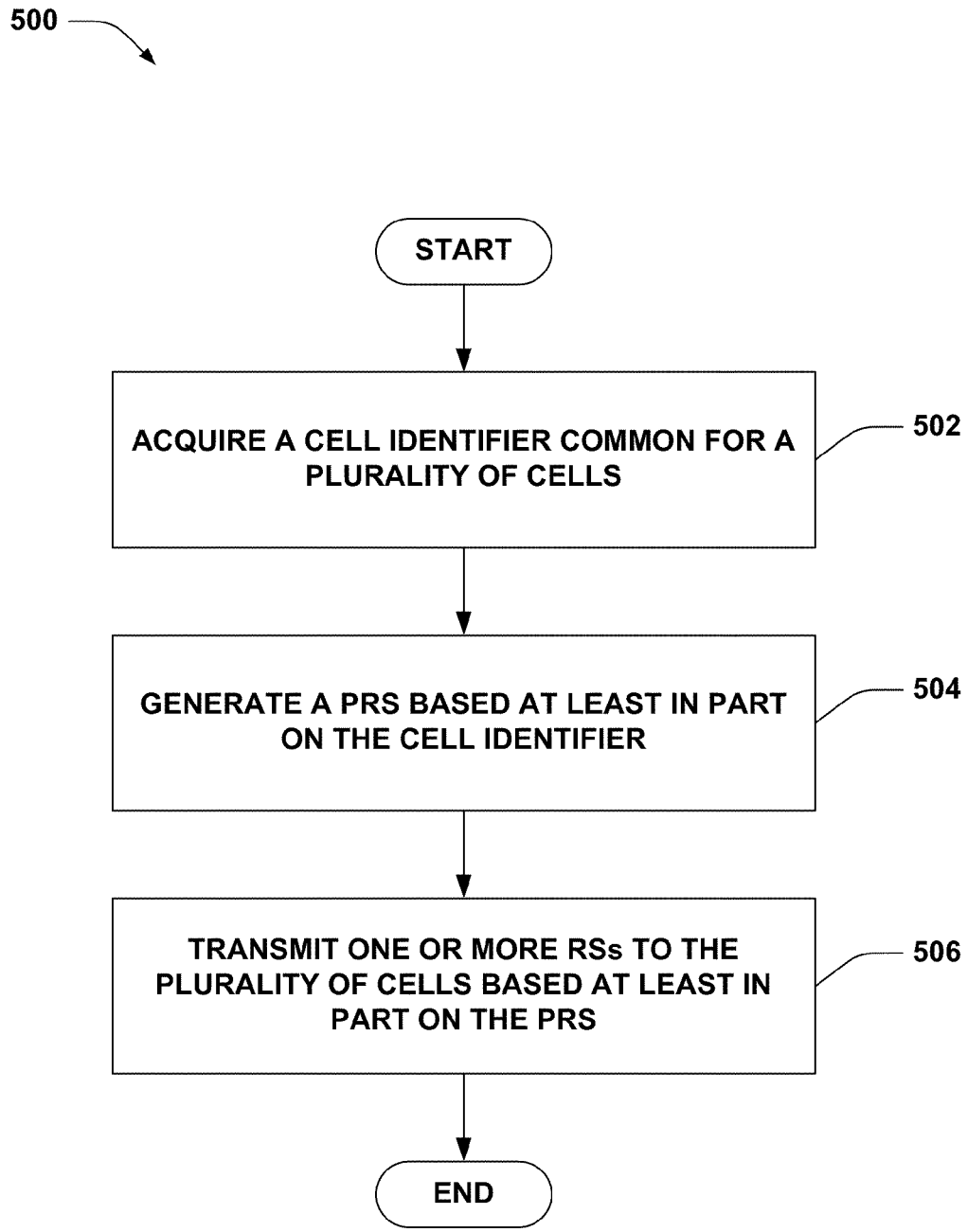
FIG. 5 illustrates an example methodology that facilitates transmitting RSs according to a PRS generated based on a cell identifier common to a plurality of cells.
Figure 6:
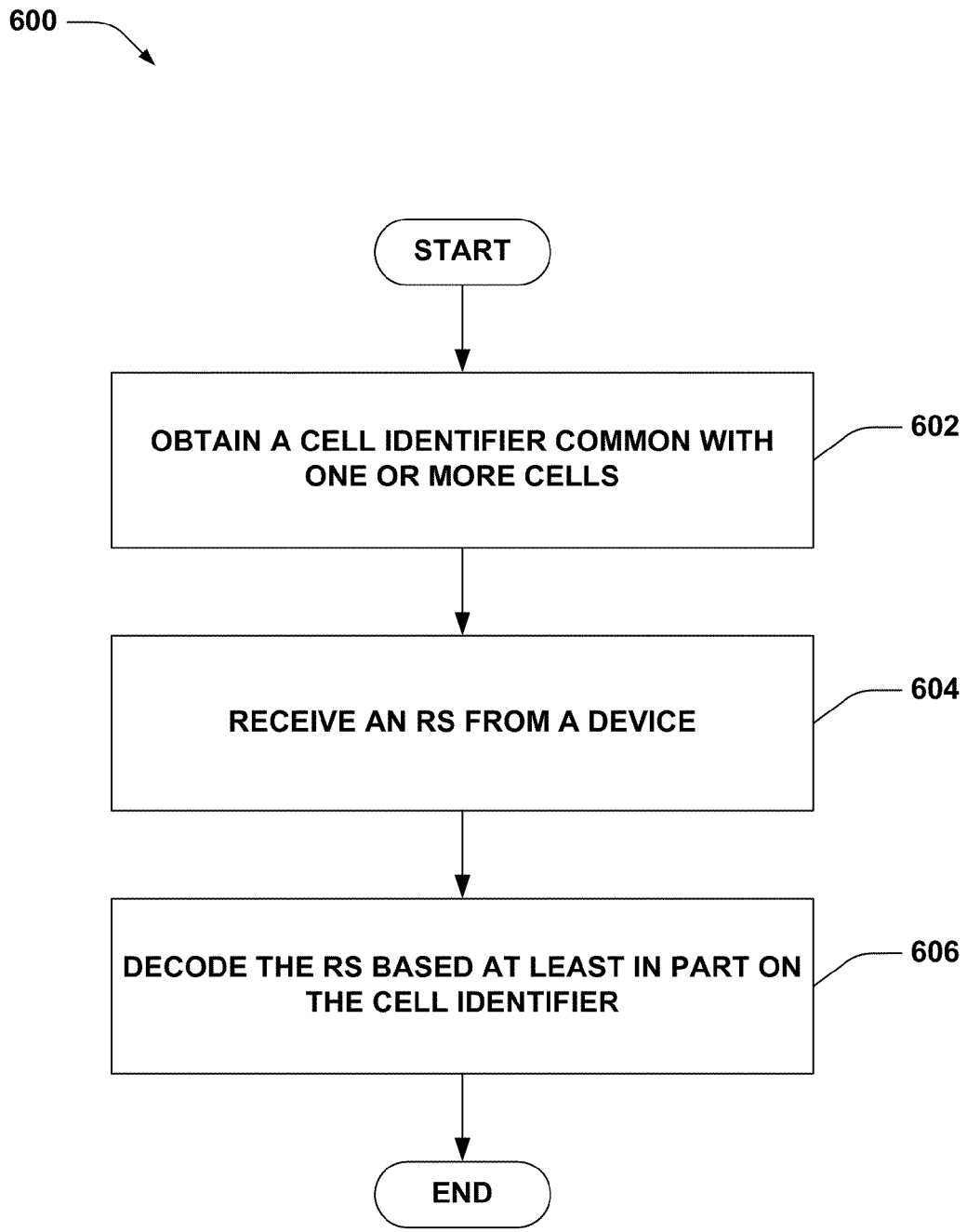
FIG. 6 illustrates an example methodology for obtaining a cell identifier common with one or more cells.
Figure 7:
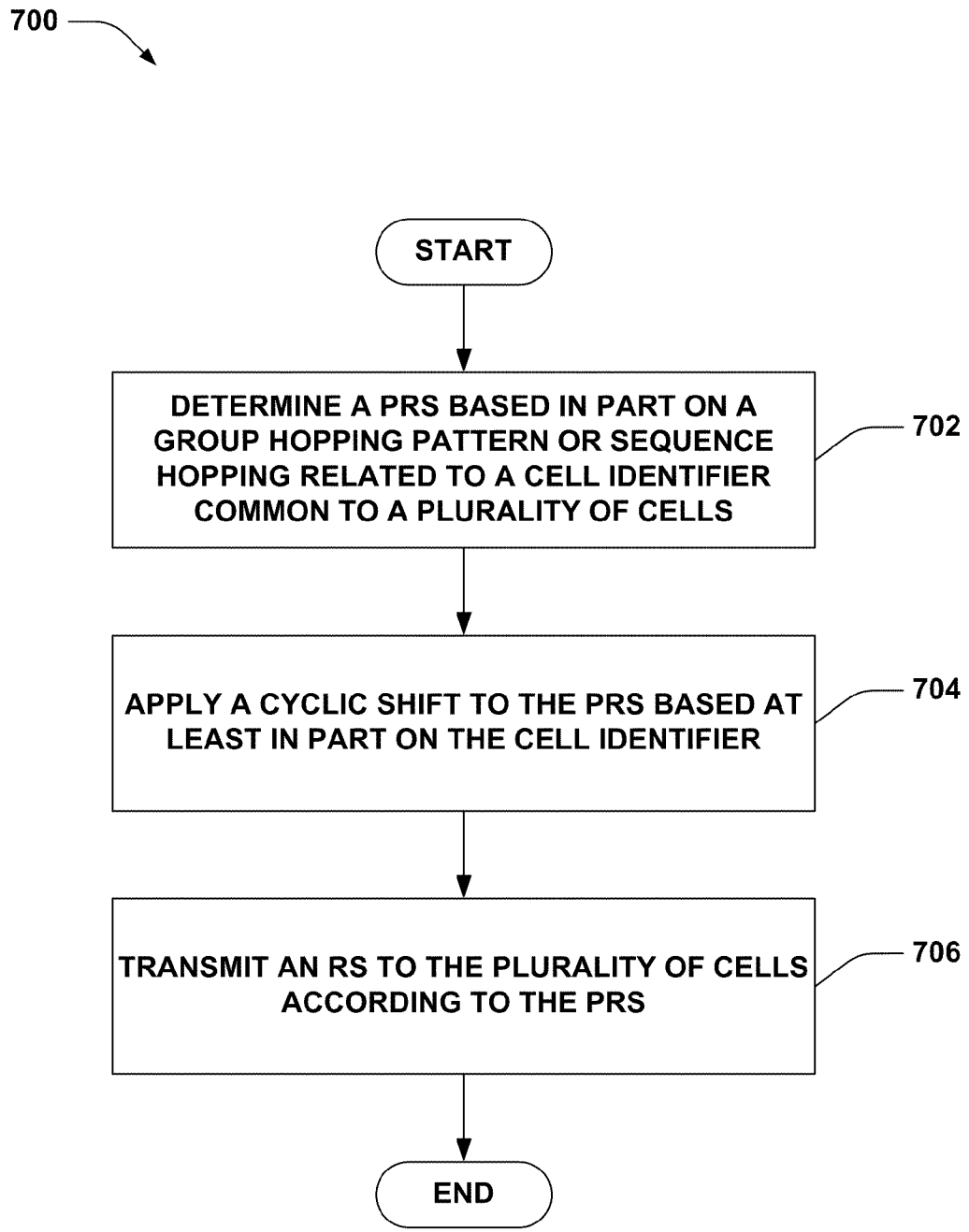
FIG. 7 illustrates an example methodology that facilitates determining and cyclically shifting a PRS for transmitting an RS.

Referring to FIGS. 5-7, example methodologies relating to generating PRSs independent of specific cell identifiers for transmitting RSs are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 5, an example methodology 500 is displayed that facilitates transmitting RSs according to a PRS generated based on a cell identifier common for a plurality of cells. At 502, a cell identifier common for a plurality of cells can be acquired. As described, for example, the cell identifier can be received from one or more base stations related to the plurality of cells (e.g., a serving base station), generated based at least in part on cell identifiers received from the one or more base stations (e.g., a concatenation, related cluster identifier, etc.), and/or the like. At 504, a PRS can be generated based at least in part on the cell identifier. Thus, in one example, the PRS can be initialized based on the cell identifier, cyclically shifted based on the cell identifier, and/or the like. Moreover, it is to be appreciated, as described, that the PRS can be generated based on one or more additional parameters common to the plurality of cells. At 506, one or more RSs can be transmitted to the plurality of cells based at least in part on the PRS.

Referring to FIG. 6, illustrated is an example methodology 600 that decodes RSs based at least in part on a cell identifier common with one or more cells. At 602, a cell identifier common with one or more cells can be obtained. As described, the cell identifier can be obtained from a disparate base station that implements at least one of the one or more cells, from a network component, and/or the like. In another example, the cell identifier can be generated based at least in part on cell identifiers of the one or more cells and/or a local cell identifier. At 604, an RS can be received from a device, and at 606, the RS can be decoded based at least in part on the cell identifier. Thus, as described, the device can utilize the cell identifier common among the one or more cells to generate the RS, and the RS can be decoded based on the cell identifier. In this regard, as described, the decoding can be similar at one or more base stations related to the one or more cells.

Turning now to FIG. 7, an example methodology 700 that facilitates transmitting an RS according to a PRS is illustrated. At 702, a PRS can be determined based in part on a group hopping pattern or sequence hopping related to a cell identifier common to a plurality of cells. Thus, for example, the PRS can be selected based on determining the group hopping pattern and a sequence hopping within the group hopping pattern, as applied to a base sequence. At 704, a cyclic shift can be applied to the PRS based at least in part on the cell identifier. This can provide additional orthogonality to the PRS, as described. At 706, an RS can be transmitted to the plurality of cells according to the PRS. Moreover, in an example, the RS can be a DM-RS, as described above.

It will be appreciated that, in accordance with one or more aspects described herein, inferences can be made regarding determining a cell identifier or other parameters common to a plurality of cells, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 8:
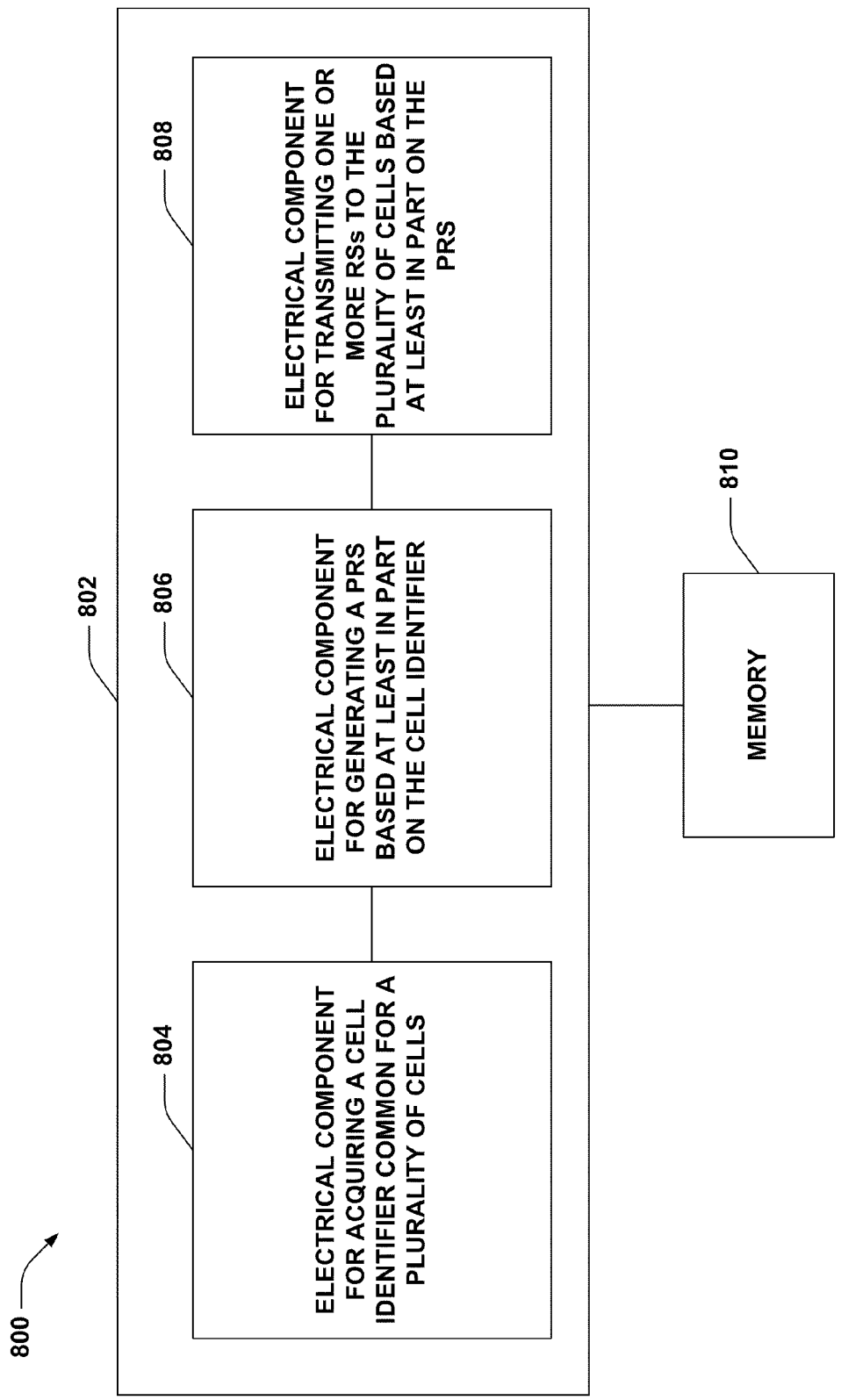
FIG. 8 illustrates an example system that facilitates transmitting RSs according to a PRS generated based on a cell identifier common to a plurality of cells.

With reference to FIG. 8, illustrated is a system 800 that transmits RSs according to a PRS generated for a plurality of cells in multi-user MIMO. For example, system 800 can reside at least partially within a base station, mobile device, etc. It is to be appreciated that system 800 is represented as including functional blocks, which can be functional blocks that represent functions implemented by a processor, software, or combination thereof (e.g., firmware). System 800 includes a logical grouping 802 of electrical components that can act in conjunction. For instance, logical grouping 802 can include an electrical component for acquiring a cell identifier common for a plurality of cells 804. For example, as described, the cell identifier can be received from a cell and/or generated based at least in part on other received cell identifiers. Further, logical grouping 802 can comprise an electrical component for generating a PRS based at least in part on the cell identifier 806.

As described, for example, electrical component 806 can generate the PRS at least by initializing the PRS according to the cell identifier, selecting the PRS (e.g., according to a group hopping pattern and/or sequence hopping determined based on the cell identifier), cyclically shifting the PRS based on the cell identifier, and/or the like, as described. Moreover, logical grouping 802 can comprise an electrical component for transmitting one or more RSs to the plurality of cells based at least in part on the PRS 808. Thus, orthogonality can be maintained for the RS by using a cell identifier to generate the PRS, while using a cell identifier common to the plurality of cells (e.g., whether related to a serving cell or generated for the plurality of cells) allows the plurality of cells, providing multi-user MIMO access to system 800, to decode the RS. Additionally, system 800 can include a memory 810 that retains instructions for executing functions associated with the electrical components 804, 806, and 808. While shown as being external to memory 810, it is to be understood that one or more of the electrical components 804, 806, and 808 can exist within memory 810.

Figure 9:
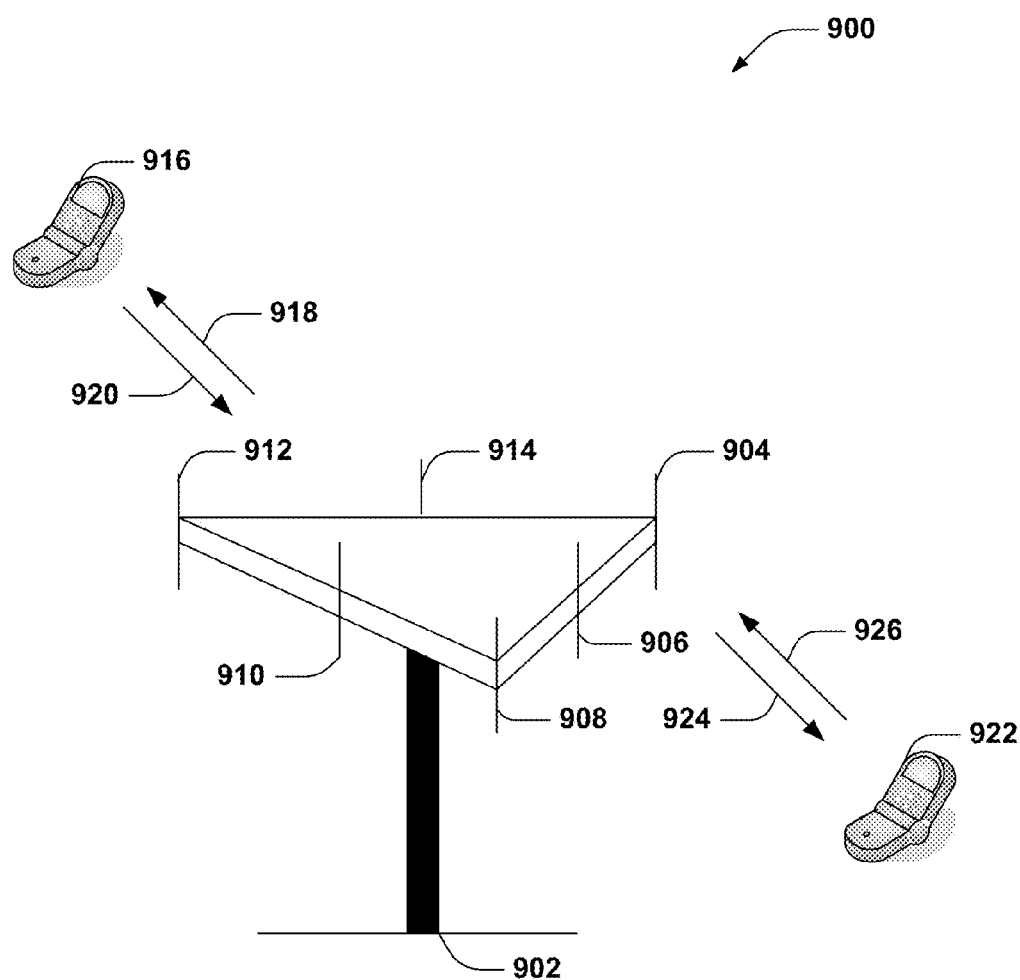
FIG. 9 illustrates an example wireless communication system in accordance with various aspects set forth herein.

Referring now to FIG. 9, a wireless communication system 900 is illustrated in accordance with various embodiments presented herein. System 900 comprises a base station 902 that can include multiple antenna groups. For example, one antenna group can include antennas 904 and 906, another group can comprise antennas 908 and 910, and an additional group can include antennas 912 and 914. Two antennas are illustrated for each antenna group; however, more or fewer antennas can be utilized for each group. Base station 902 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 902 can communicate with one or more mobile devices such as mobile device 916 and mobile device 922; however, it is to be appreciated that base station 902 can communicate with substantially any number of mobile devices similar to mobile devices 916 and 922. Mobile devices 916 and 922 can be, for example, cellular phones, smart phones, laptops, handheld communication devices, handheld computing devices, satellite radios, global positioning systems, PDAs, and/or any other suitable device for communicating over wireless communication system 900. As depicted, mobile device 916 is in communication with antennas 912 and 914, where antennas 912 and 914 transmit information to mobile device 916 over a forward link 918 and receive information from mobile device 916 over a reverse link 920. Moreover, mobile device 922 is in communication with antennas 904 and 906, where antennas 904 and 906 transmit information to mobile device 922 over a forward link 924 and receive information from mobile device 922 over a reverse link 926. In a frequency division duplex (FDD) system, forward link 918 can utilize a different frequency band than that used by reverse link 920, and forward link 924 can employ a different frequency band than that employed by reverse link 926, for example. Further, in a time division duplex (TDD) system, forward link 918 and reverse link 920 can utilize a common frequency band and forward link 924 and reverse link 926 can utilize a common frequency band.

Each group of antennas and/or the area in which they are designated to communicate can be referred to as a sector of base station 902. For example, antenna groups can be designed to communicate to mobile devices in a sector of the areas covered by base station 902. In communication over forward links 918 and 924, the transmitting antennas of base station 902 can utilize beamforming to improve signal-to-noise ratio of forward links 918 and 924 for mobile devices 916 and 922. Also, while base station 902 utilizes beamforming to transmit to mobile devices 916 and 922 scattered randomly through an associated coverage, mobile devices in neighboring cells can be subject to less interference as compared to a base station transmitting through a single antenna to all its mobile devices. Moreover, mobile devices 916 and 922 can communicate directly with one another using a peer-to-peer or ad hoc technology as depicted. According to an example, system 900 can be a multiple-input multiple-output (MIMO) communication system.

Figure 10:
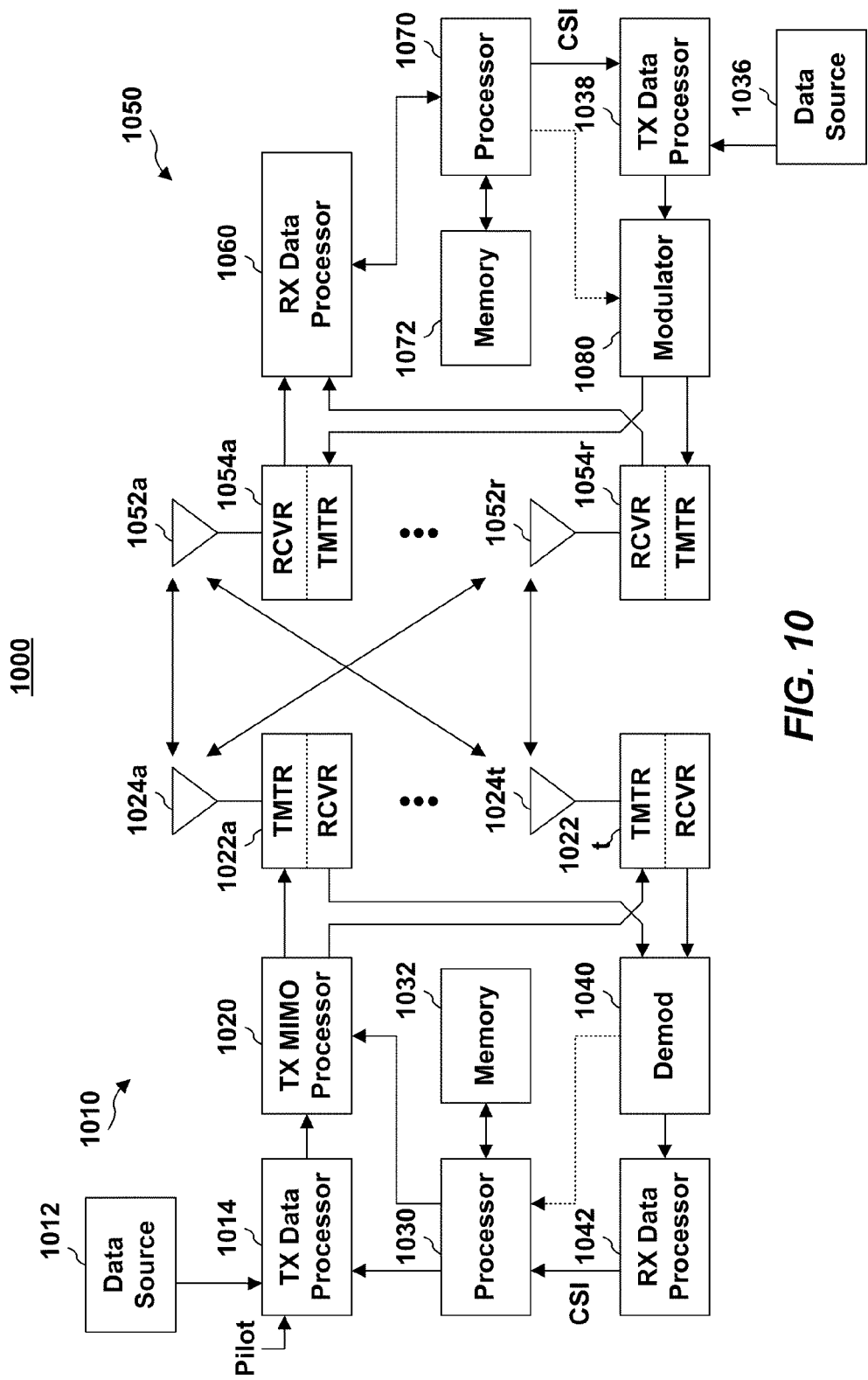
FIG. 10 illustrates an example wireless network environment that can be employed in conjunction with the various systems and methods described herein.

FIG. 10 shows an example wireless communication system 1000. The wireless communication system 1000 depicts one base station 1010 and one mobile device 1050 for sake of brevity. However, it is to be appreciated that system 1000 can include more than one base station and/or more than one mobile device, wherein additional base stations and/or mobile devices can be substantially similar or different from example base station 1010 and mobile device 1050 described below. In addition, it is to be appreciated that base station 1010 and/or mobile device 1050 can employ the systems (FIGS. 1-4 and 8-9) and/or methods (FIGS. 5-7) described herein to facilitate wireless communication there between.

At base station 1010, traffic data for a number of data streams is provided from a data source 1012 to a transmit (TX) data processor 1014. According to an example, each data stream can be transmitted over a respective antenna. TX data processor 1014 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1050 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1030.

The modulation symbols for the data streams can be provided to a TX MIMO processor 1020, which can further process the modulation symbols (e.g., for OFDM). TX MIMO processor 1020 then provides NT modulation symbol streams to NT transmitters (TMTR) 1022*a* through 1022*t*. In various embodiments, TX MIMO processor 1020 applies beamforming weights to the symbols of the data streams and to the antenna from which the symbol is being transmitted.

Each transmitter 1022 receives and processes a respective symbol stream to provide one or more analog signals, and further conditions (e.g., amplifies, filters, and upconverts) the analog signals to provide a modulated signal suitable for transmission over the MIMO channel. Further, NT modulated signals from transmitters 1022*a* through 1022*t* are transmitted from NT antennas 1024*a* through 1024*t*, respectively.

At mobile device 1050, the transmitted modulated signals are received by NR antennas 1052*a* through 1052*r* and the received signal from each antenna 1052 is provided to a respective receiver (RCVR) 1054*a* through 1054*r*. Each receiver 1054 conditions (e.g., filters, amplifies, and downconverts) a respective signal, digitizes the conditioned signal to provide samples, and further processes the samples to provide a corresponding "received" symbol stream.

An RX data processor 1060 can receive and process the NR received symbol streams from NR receivers 1054 based on a particular receiver processing technique to provide NT "detected" symbol streams. RX data processor 1060 can demodulate, deinterleave, and decode each detected symbol stream to recover the traffic data for the data stream. The processing by RX data processor 1060 is complementary to that performed by TX MIMO processor 1020 and TX data processor 1014 at base station 1010.

A processor 1070 can periodically determine which precoding matrix to utilize as discussed above. Further, processor 1070 can formulate a reverse link message comprising a matrix index portion and a rank value portion.

The reverse link message can comprise various types of information regarding the communication link and/or the received data stream. The reverse link message can be processed by a TX data processor 1038, which also receives traffic data for a number of data streams from a data source 1036, modulated by a modulator 1080, conditioned by transmitters 1054*a* through 1054*r*, and transmitted back to base station 1010.

At base station 1010, the modulated signals from mobile device 1050 are received by antennas 1024, conditioned by receivers 1022, demodulated by a demodulator 1040, and processed by a RX data processor 1042 to extract the reverse link message transmitted by mobile device 1050. Further, processor 1030 can process the extracted message to determine which precoding matrix to use for determining the beamforming weights.

Processors 1030 and 1070 can direct (e.g., control, coordinate, manage, etc.) operation at base station 1010 and mobile device 1050, respectively. Respective processors 1030 and 1070 can be associated with memory 1032 and 1072 that store program codes and data. Processors 1030 and 1070 can also perform computations to derive frequency and impulse response estimates for the uplink and downlink, respectively.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for reference signal transmission in wireless communications, comprising:
   acquiring a cell identifier common for a plurality of cells;
   generating a pseudo-random sequence (PRS) based at least in part on the cell identifier;
   determining a group hopping pattern for the PRS based at least in part on the cell identifier, wherein the generating the PRS is further based at least in part on the group hopping pattern; and
   transmitting one or more reference signals to the plurality of cells based at least in part on the PRS.

2. The method of claim 1, wherein the generating the PRS comprises initializing the PRS based at least in part on the cell identifier.

3. The method of claim 2, further comprising acquiring one or more parameters common for the plurality of cells, wherein the initializing is further based at least in part on the one or more parameters.

4. The method of claim 3, wherein the one or more parameters relates to a sequence shift pattern or a codeword index.

5. The method of claim 1, further comprising determining a slot index alignment for the plurality of cells, wherein the generating the PRS is further based at least in part on the slot index alignment.

6. The method of claim 5, further comprising generating a disparate PRS for cyclically shifting the PRS over a period of time based at least in part on the cell identifier.

7. The method of claim 5, further comprising determining a sequence hopping for the PRS based at least in part on the cell identifier, wherein the generating the PRS is further based at least in part on the sequence hopping within the group hopping pattern.

8. The method of claim 1, wherein the acquiring the cell identifier includes receiving the cell identifier from a base station or generating the cell identifier based at least in part on one or more disparate cell identifiers received from one or more base stations associated with the plurality of cells.

9. The method of claim 1, wherein the cell identifier relates to a serving cell in the plurality of cells.

10. A wireless communications apparatus for reference signal transmission, comprising:
    at least one processor; and
    a memory coupled to the at least one processor, wherein the at least one processor is configured to:
      determine a cell identifier common for a plurality of cells;
      generate a pseudo-random sequence (PRS) based at least in part on the cell identifier;
      determine a group hopping pattern for the PRS based at least in part on the cell identifier, and the at least one processor generates the PRS further based at least in part on the group hopping pattern; and
      transmit one or more reference signals to the plurality of cells over similar resource assignments based at least in part on the PRS.

11. The wireless communications apparatus of claim 10, wherein the at least one processor generates the PRS at least in part by initializing the PRS based at least in part on the cell identifier.

12. The wireless communications apparatus of claim 11, wherein the at least one processor is further configured to acquire one or more parameters common for the plurality of cells, and the at least one processor initializes the PRS based further at least in part on the one or more parameters.

13. The wireless communications apparatus of claim 12, wherein the one or more parameters relates to a sequence shift pattern or a codeword index.

14. The wireless communications apparatus of claim 10, wherein the at least one processor is further configured to determine a slot index alignment for the plurality of cells, and the at least one processor generates the PRS based further at least in part on the slot index alignment.

15. The wireless communications apparatus of claim 14, wherein the at least one processor is further configured to generate a disparate PRS for cyclically shifting the PRS over a period of time based at least in part on the cell identifier.

16. The wireless communications apparatus of claim 10, wherein the at least one processor is further configured to determine a sequence hopping for the PRS based at least in part on the cell identifier, and the at least one processor generates the PRS further based at least in part on the sequence hopping within the group hopping pattern.

17. The wireless communications apparatus of claim 10, wherein the at least one processor determines the cell identifier based at least in part on receiving the cell identifier from a base station or generating the cell identifier based at least in part on one or more disparate cell identifiers received from one or more base stations that are associated with the plurality of cells.

18. The wireless communications apparatus of claim 10, wherein the cell identifier relates to a serving cell in the plurality of cells.

19. An apparatus for wireless communications, comprising:
   means for acquiring a cell identifier common for a plurality of cells;
   means for generating a pseudo-random sequence (PRS) based at least in part on the cell identifier;
   means for determining a group hopping pattern for the PRS based at least in part on the cell identifier, wherein the means for generating generates the PRS further based at least in part on the group hopping pattern; and
   means for transmitting one or more reference signals to the plurality of cells based at least in part on the PRS.

20. The apparatus of claim 19, wherein the means for generating the PRS further initializes the PRS based at least in part on the cell identifier.

21. The apparatus of claim 20, wherein the means for acquiring further acquires one or more parameters common for the plurality of cells, and the means for generating initializes the PRS further based at least in part on the one or more parameters.

22. The apparatus of claim 21, wherein the one or more parameters relates to a sequence shift pattern or a codeword index.

23. The apparatus of claim 19, wherein the means for generating further determines a slot index alignment for the plurality of cells, and generates the PRS further based at least in part on the slot index alignment.

24. The apparatus of claim 23, further comprising means for generating a random sequence for cyclically shifting the PRS over a period of time based at least in part on the cell identifier.

25. The apparatus of claim 19, further comprising means for determining a sequence hopping for the PRS based at least in part on the cell identifier, wherein the means for generating generates the PRS further based at least in part on the sequence hopping within the group hopping pattern.

26. The apparatus of claim 19, wherein the means for acquiring receives the cell identifier from a base station or generates the cell identifier based at least in part on one or more disparate cell identifiers received from one or more base stations that are associated with the plurality of cells.

27. The apparatus of claim 19, wherein the cell identifier relates to a serving cell in the plurality of cells.

28. A computer program product for reference signal transmission in wireless communications, the computer program product comprising a non-transitory computer-readable storage medium that includes instructions for causing at least one computer to:
   determine a cell identifier common for a plurality of cells;
   generate a pseudo-random sequence (PRS) based at least in part on the cell identifier;
   determine a group hopping pattern for the PRS based at least in part on the cell identifier, and the instructions for causing the at least one computer to generate the PRS generates the PRS further based at least in part on the group hopping pattern; and
   transmit one or more reference signals to the plurality of cells over similar resource assignments based at least in part on the PRS.

29. The computer program product of claim 28, wherein the instructions for causing the at least one computer to generate the PRS generates the PRS at least in part by initializing the PRS based at least in part on the cell identifier.

30. The computer program product of claim 29, wherein the non-transitory computer-readable storage medium further includes instructions for causing the at least one computer to acquire one or more parameters common for the plurality of cells, and the instructions for causing the at least one computer to generate the PRS initializes the PRS based further at least in part on the one or more parameters.

31. The computer program product of claim 30, wherein the one or more parameters relates to a sequence shift pattern or a codeword index.

32. The computer program product of claim 28, wherein the non-transitory computer-readable storage medium further includes instructions for causing the at least one computer to determine a slot index alignment for the plurality of cells, and the instructions for causing the at least one computer to generate the PRS generates the PRS based further at least in part on the slot index alignment.

33. The computer program product of claim 32, wherein the non-transitory computer-readable storage medium further includes instructions for causing the at least one computer to generate a random sequence for cyclically shifting the PRS over a period of time based at least in part on the cell identifier.

34. The computer program product of claim 28, wherein the non-transitory computer-readable storage medium further includes instructions for causing the at least one computer to determine a sequence hopping for the PRS based at least in part on the cell identifier, and the instructions for causing the at least one computer to generate the PRS generates the PRS further based at least in part on the sequence hopping within the group hopping pattern.

35. The computer program product of claim 28, wherein the instructions for causing the at least one computer to determine the cell identifier determines the cell identifier based at least in part on receiving the cell identifier from a base station or generating the cell identifier based at least in part on one or more disparate cell identifiers received from one or more base stations that are associated with the plurality of cells.

36. The computer program product of claim 28, wherein the cell identifier relates to a serving cell in the plurality of cells.

37. A method for wireless communications, comprising:
   receiving one or more reference signals based at least in part on a pseudo-random sequence (PRS), wherein the PRS is generated based at least in part on a cell identifier common for a plurality of cells and a group hopping pattern which is based at least in part on the cell identifier; and
   decoding the one or more reference signals.

38. The method of claim 37, wherein the PRS is initialized based at least in part on the cell identifier.

39. The method of claim 38, wherein the PRS is initialized based at least in part on one or more parameters common to the plurality of cells, the one or more parameters being related to a sequence shift pattern or a codeword index.

40. The method of claim 37, wherein the cell identifier is generated based at least in part on one or more disparate cell identifiers from one or more base stations that are associated with the plurality of cells.

41. The method of claim 37, wherein the cell identifier relates to a serving cell in the plurality of cells.

42. An apparatus for wireless communications, comprising:
   means for receiving one or more reference signals based at least in part on a pseudo-random sequence (PRS), wherein the PRS is generated based at least in part on a cell identifier common for a plurality of cells and a group hopping pattern which is based at least in part on the cell identifier; and means for decoding the one or more reference signals.

43. The apparatus of claim 42, wherein the PRS is initialized based at least in part on the cell identifier.

44. The apparatus of claim 43, wherein the PRS is initialized based at least in part on one or more parameters common to the plurality of cells, the one or more parameters being related to a sequence shift pattern or a codeword index.

45. The apparatus of claim 42, wherein the cell identifier is generated based at least in part on one or more disparate cell identifiers from one or more base stations that are associated with the plurality of cells.

46. The apparatus of claim 42, wherein the cell identifier relates to a serving cell in the plurality of cells.

47. A computer program product for reference signal reception in wireless communications, the computer program product comprising a non-transitory computer-readable storage medium that includes instructions for causing at least one computer to:

receive one or more reference signals based at least in part on a pseudo-random sequence (PRS), wherein the PRS is generated based at least in part on a cell identifier common for a plurality of cells and a group hopping pattern which is based at least in part on the cell identifier; and decode the one or more reference signals.

48. The computer program product of claim 47, wherein the PRS is initialized based at least in part on the cell identifier.

49. The computer program product of claim 48, wherein the PRS is initialized based at least in part on one or more parameters common to the plurality of cells, the one or more parameters being related to a sequence shift pattern or a codeword index.

50. The computer program product of claim 47, wherein the cell identifier is generated based at least in part on one or more disparate cell identifiers from one or more base stations that are associated with the plurality of cells.

51. The computer program product of claim 47, wherein the cell identifier relates to a serving cell in the plurality of cells.

52. A wireless communications apparatus for reference signal transmission, comprising:

at least one processor; and a memory coupled to the at least one processor, wherein the at least one processor is configured to:

receive one or more reference signals based at least in part on a pseudo-random sequence (PRS), wherein the PRS is generated based at least in part on a cell identifier common for a plurality of cells and a group hopping pattern which is based at least in part on the cell identifier; and decode the one or more reference signals.

53. The wireless communications apparatus of claim 52, wherein the PRS is initialized based at least in part on the cell identifier.

54. The wireless communications apparatus of claim 53, wherein the PRS is initialized based at least in part on one or more parameters common to the plurality of cells, the one or more parameters being related to a sequence shift pattern or a codeword index.

55. The wireless communications apparatus of claim 52, wherein the cell identifier is generated based at least in part on one or more disparate cell identifiers from one or more base stations that are associated with the plurality of cells.

56. The wireless communications apparatus of claim 52, wherein the cell identifier relates to a serving cell in the plurality of cells.

* * * * *